C. NAPIER.
METAL SAWING MACHINE.
APPLICATION FILED DEC. 12, 1916.

1,360,972.

Patented Nov. 30, 1920.
7 SHEETS—SHEET 1.

WITNESS:
B. A. Seaver

INVENTOR,
Charles Napier;
BY
ATTORNEY.

C. NAPIER.
METAL SAWING MACHINE.
APPLICATION FILED DEC. 12, 1916.

1,360,972.

Patented Nov. 30, 1920.
7 SHEETS—SHEET 2.

INVENTOR,
Charles Napier,
BY
ATTORNEY.

C. NAPIER.
METAL SAWING MACHINE.
APPLICATION FILED DEC. 12, 1916.

1,360,972.

Patented Nov. 30, 1920.
7 SHEETS—SHEET 3.

WITNESS:
B.A. Seaver.

INVENTOR,
Charles Napier,
BY
ATTORNEY.

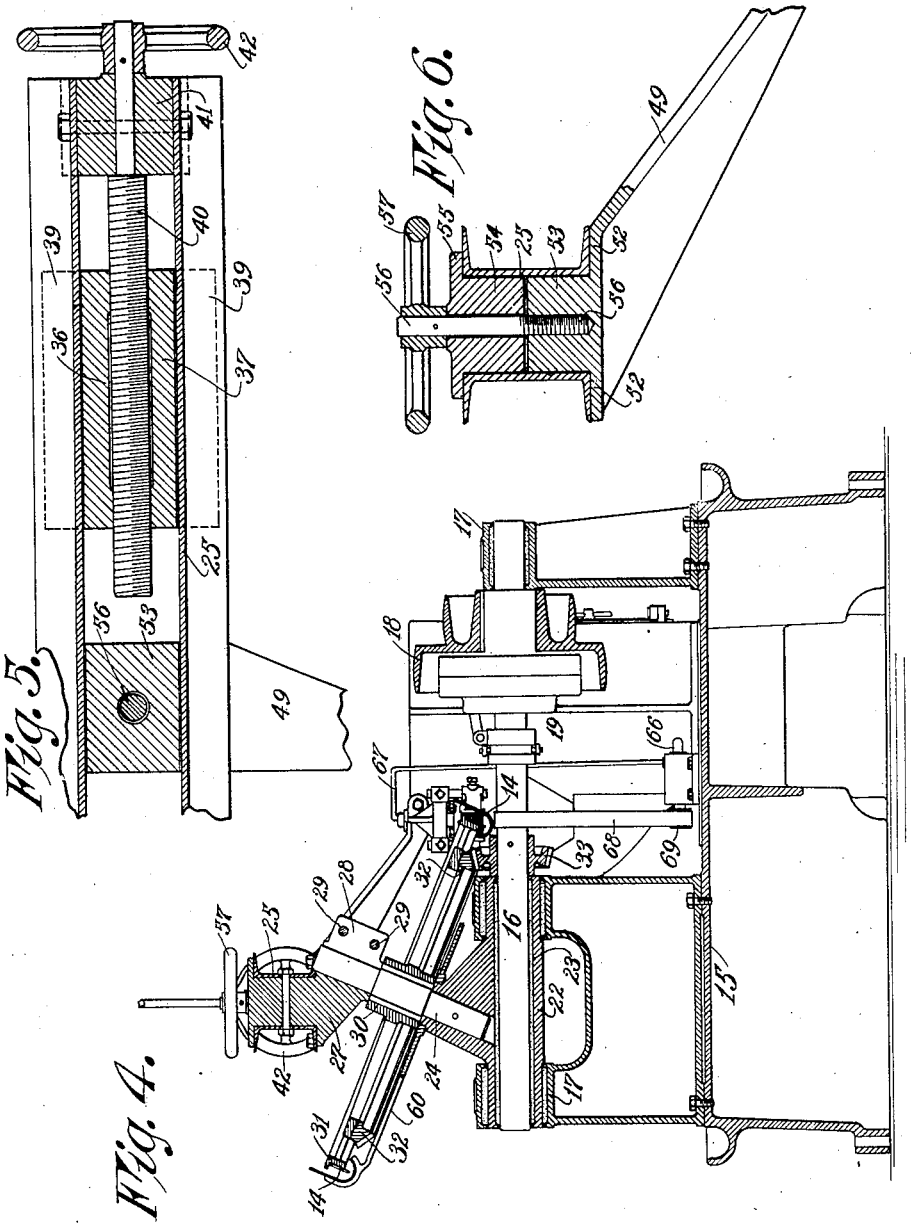

C. NAPIER.
METAL SAWING MACHINE.
APPLICATION FILED DEC. 12, 1916.
1,360,972.
Patented Nov. 30, 1920.
7 SHEETS—SHEET 5.
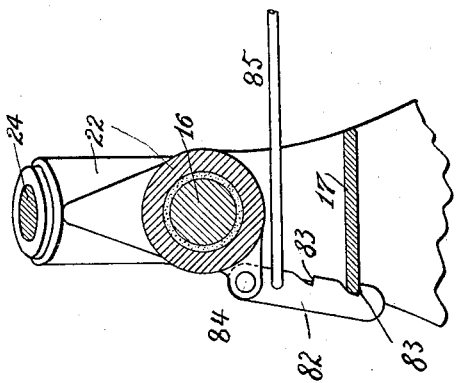
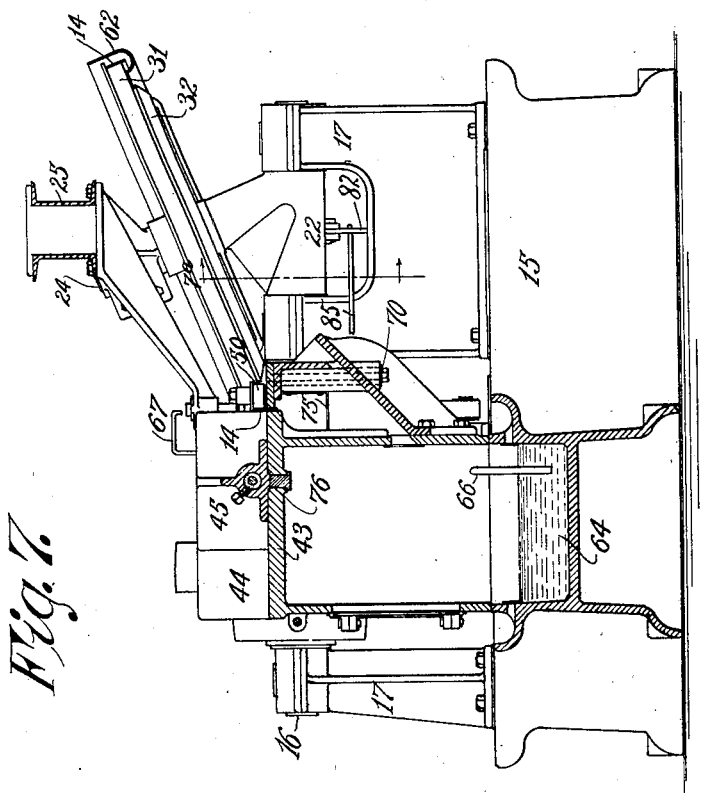
WITNESS:
B A Seaver
INVENTOR,
Charles Napier,
BY
ATTORNEY.

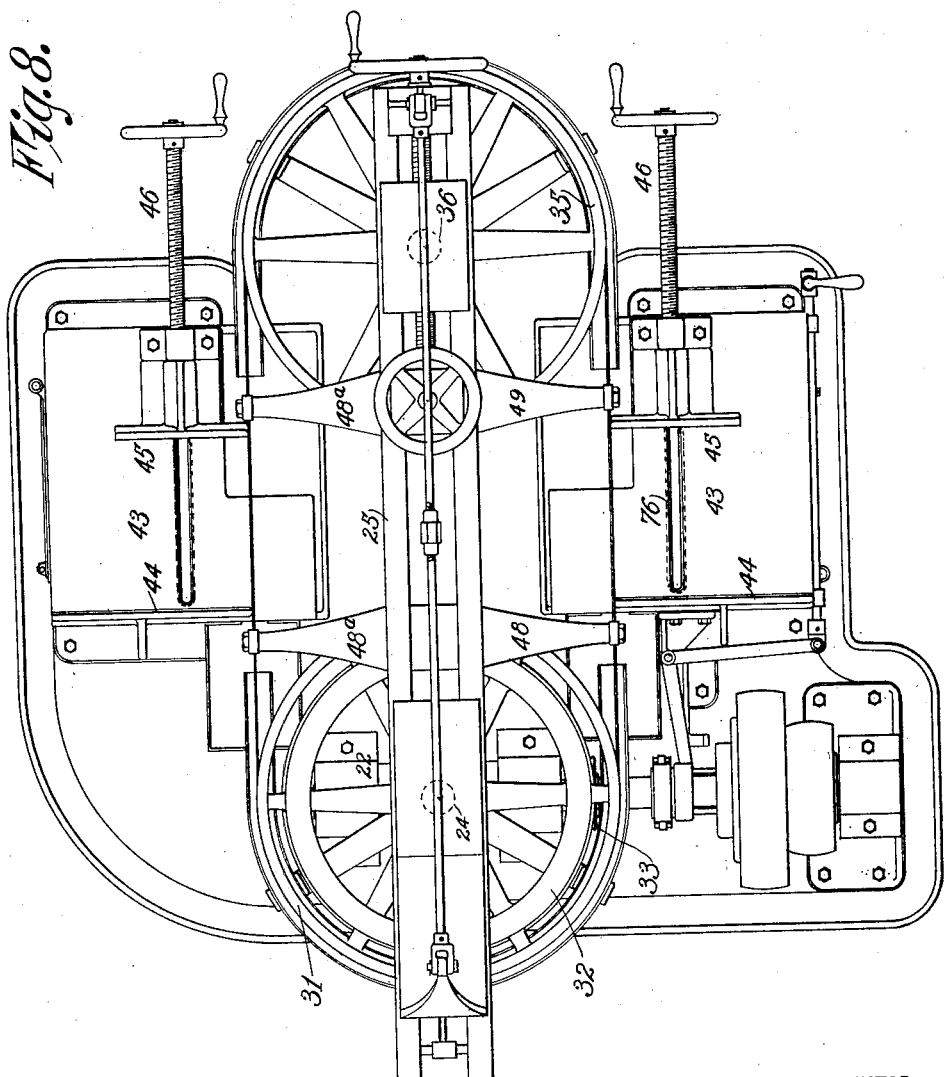

C. NAPIER.
METAL SAWING MACHINE.
APPLICATION FILED DEC. 12, 1916.
1,360,972.
Patented Nov. 30, 1920.
7 SHEETS—SHEET 7.
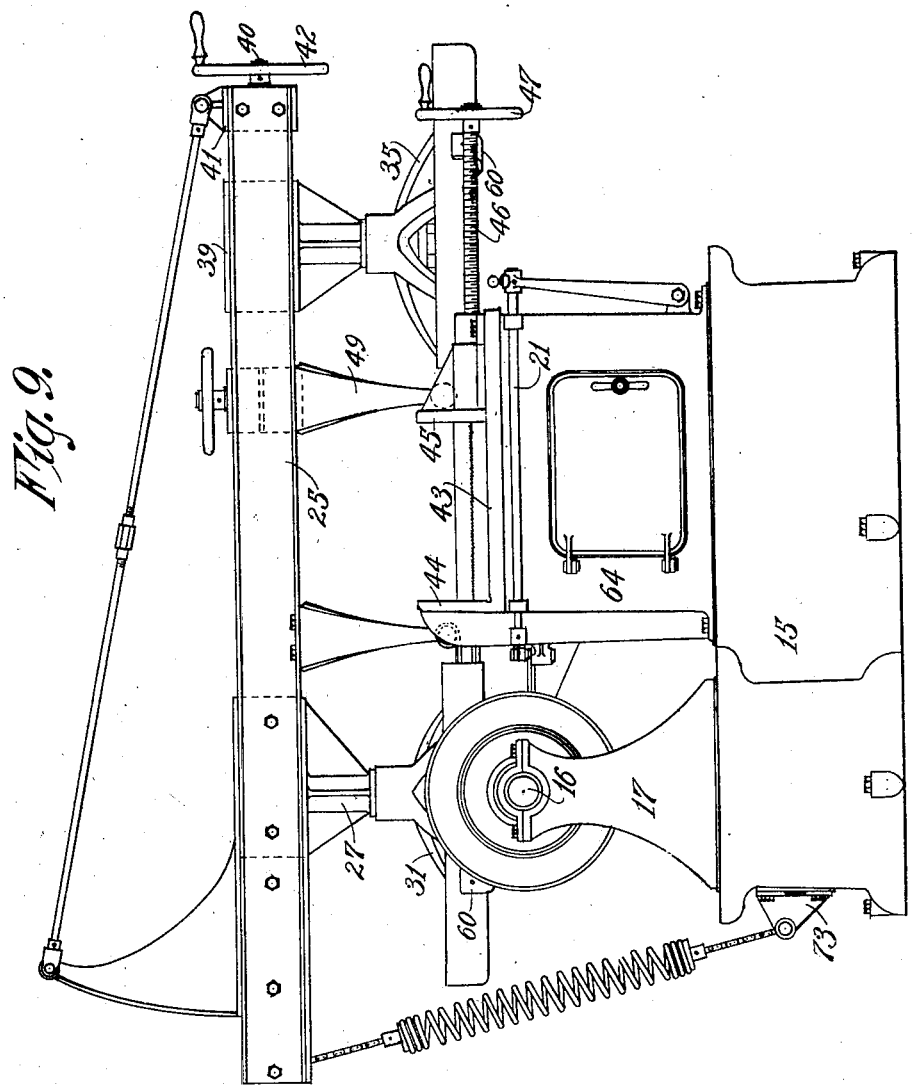
WITNESS:
INVENTOR,
Charles Napier,
BY
ATTORNEY.

UNITED STATES PATENT OFFICE.

CHARLES NAPIER, OF SPRINGFIELD, MASSACHUSETTS, ASSIGNOR, BY MESNE ASSIGNMENTS, TO METAL SAW & MACHINE CO., INC., OF SPRINGFIELD, MASSACHUSETTS, A CORPORATION OF MASSACHUSETTS.

METAL-SAWING MACHINE.

1,360,972.     Specification of Letters Patent.     Patented Nov. 30, 1920.

Application filed December 12, 1916. Serial No. 136,456.

*To all whom it may concern:*

Be it known that I, CHARLES NAPIER, a citizen of the United States of America, and resident of Springfield, in the county of Hampden and State of Massachusetts, have invented certain new and useful Improvements in Metal-Sawing Machines, of which the following is a full, clear, and exact description.

This invention relates to improvements in machines, for sawing metal, of a kind comprising a band saw to which a continuously progressive movement in one direction is imparted, and in which a straight course of the band saw runs in proper relation to supporting and confining means for the bar, shaft or other piece of metal to be cut, usually transversely of the length thereof.

The machine in a general way resembles that for which I obtained Letters Patent of the United States Sept. 28th, 1909, No. 935,395; but this machine in accordance with the present invention, embodies a new and improved organization, and novel combinations and arrangements of parts which greatly improve the same in point of operative efficiency and practicability, and commercial acceptability.

The invention is described in conjunction with the accompanying drawings and is set forth in the claims.

In the drawings:—

Fig. 4 is a sectional view taken transversely of the machine near one end thereof, that is on the vertical plane represented by line 4—4, Fig. 1.

Fig. 5 is a partial horizontal section taken longitudinally of the swing beam of the machine on line 5—5, Fig. 2;

Fig. 6 is a partial transverse section as taken on line 6—6, Fig. 2;

Figure 2:
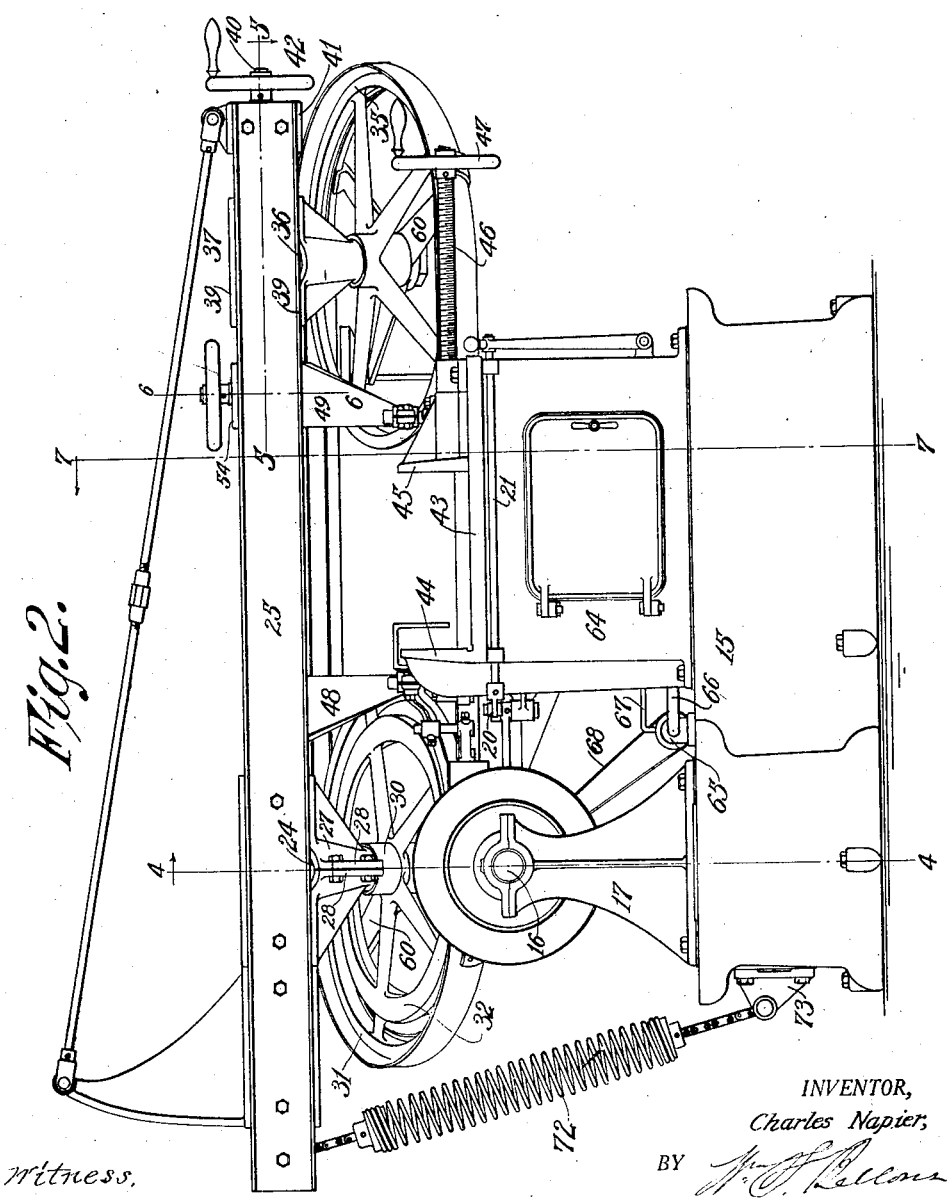
Fig. 2 is a front elevation of the same.
Figure 3:
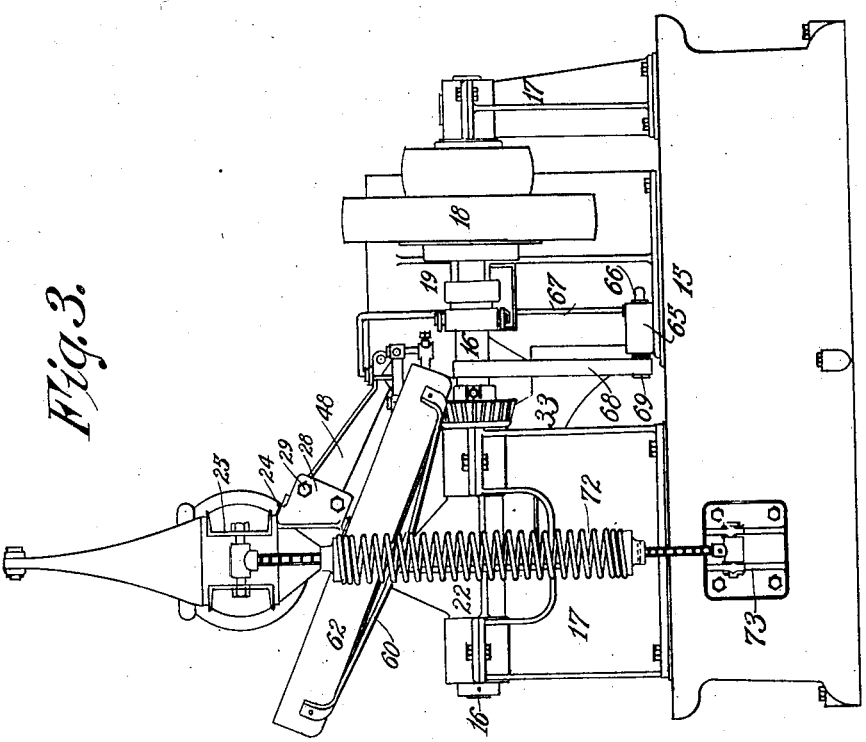
Fig. 3 is a left-hand elevation of the machine.

Fig. 7 is a sectional elevation of the machine seen at and beyond the transverse plane indicated by line 7—7, Fig. 2; Fig. 7ª represents a detent device to be hereinafter referred to; and Figs. 8 and 9 are respectively plan and front elevations of a machine comprising two work supporting and confining devices and operable to effect two severing cuts by the band saw, by the oppositely located and reversely running straight courses thereof.

In the drawings, 15 represents a bed or supporting frame having at one end thereof, here represented as the left hand end, a transverse shaft 16, horizontally mounted in journal supports or pillars 17, 17, therefor.

Rotation under sufficient power is imparted to the shaft 16 through the belt driven pulley 18 in conjunction with which is the clutch 19 operated through bell crank lever 20 and thrust rod 21.

The shaft 16 bears in a long bushing 23 in a bore in the sleeve 22 having exterior spaced bearings independently of the shaft 16 in one of the pillars 17. The structure 17, 22, 23, 16 constitutes a wide and accurate bearing for independent motion of shaft 16 and sleeve 22 adapted to resist great stresses tending to turn either out of line.

The said sleeve has an upwardly extended member comprising a stud 24, to the upper portion of which the longitudinally arranged beam 25 is rigidly secured, such beam being capable of swinging movement up and down relatively to the length of the machine and from the shaft 16 as the center of movement.

For the rigid attachment of the beam to the upper portion of the stud 24, the part or member 27, connected with or forming part of the beam, has a circular bore for the stud, the bore being formed split with extension ears 28, 28 at opposite sides of the cleft and is adapted to be constricted with powerful force by the nut-provided clamping bolts 29.

The said upstanding stud 24 is encircled by, and forms the bearing for, the hub 30 of the combined saw driving wheel 31 and the bevel gear wheel 32, the said hub and wheels 31 and 32 being concentric one with another and integral with or attached to each other.

The driving shaft 16 of the machine has on a suitable intermediate portion of the length thereof, a fixed bevel gear wheel or pinion 33 in mesh with the bevel gear wheel 32.

At the end of the swing beam, the farther from its connection to the stud 24, is a saw guiding wheel 35 of the same diameter and of the same general character as the saw guiding and driving wheel 31.

This saw guiding wheel 35 is mounted for rotation on a depending stud 36, formed as a part of, or attached to, a block 37 which is adjustable longitudinally of the swing beam 25.

The said beam comprises opposite side members suitably attached one to another by cross blocks or ties, and is open for considerable portions of its length between the tie blocks.

The aforesaid block 37 has the body thereof fitted for sliding movement between the opposite side members of the swing beam, and is provided with flanges 39, 39, which have overlapping engagements with the edges of such side members.

This block 37 and the band saw supporting and guiding wheel 35, supported thereby, are longitudinally adjusted by means of a screw shaft 40 which is rotatable but endwise non-movable relatively to the end tie block 41 of the beam, and which shaft has a screw engagement through the block 37.

A hand wheel 42 is shown as provided on the outwardly protruding end of the screw shaft for constituting a convenient means for the turning of the latter.

Figure 1:
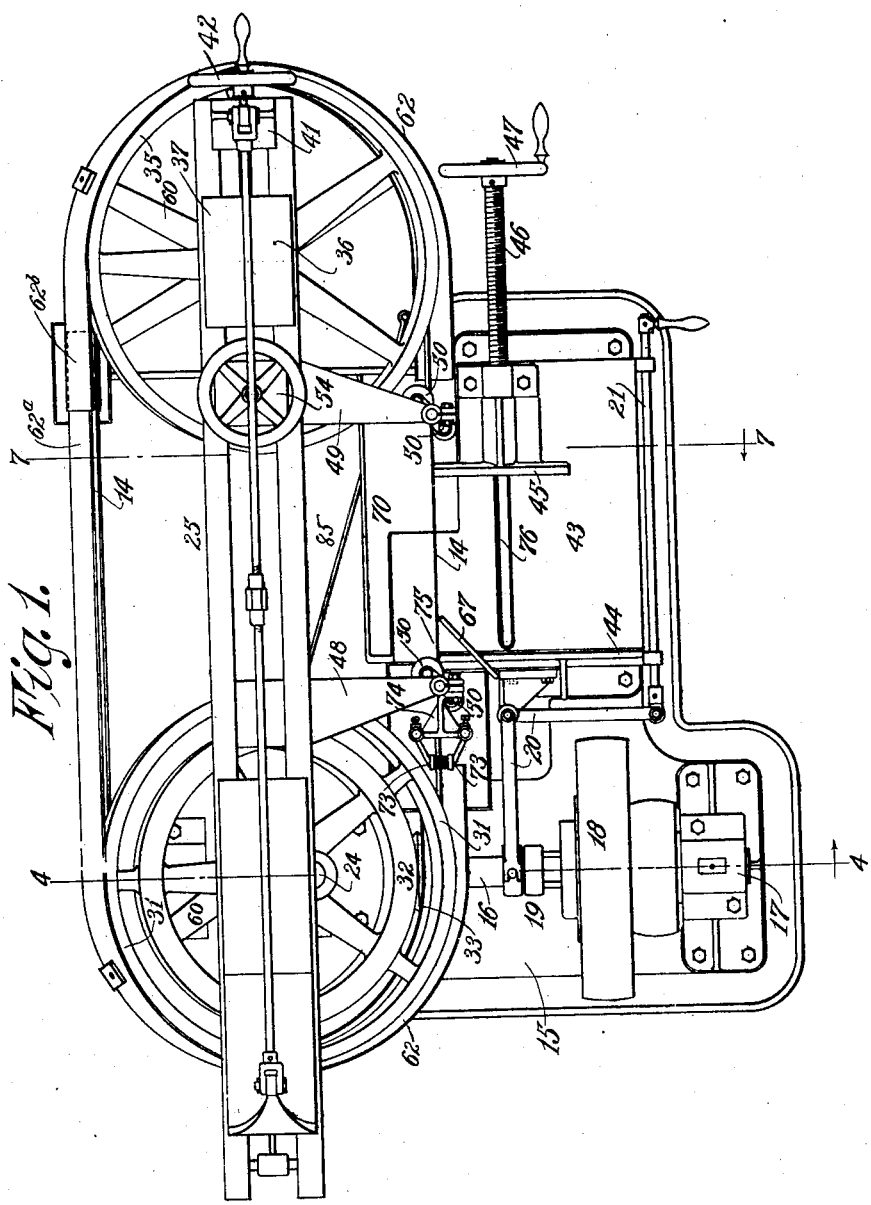
Figure 1 is a plan view of the improved machine.

In Figs. 1 and 2 a support and confining means for the bar or metal piece to be sawed is shown in relation to the forward straight course of the band saw, 14.

This includes a table-like support 43, and a vise inclusive of the fixed jaw or abutment 44, the movable jaw 45, and jaw operating screw 46 provided with operating hand wheel 47.

The swing beam 25 is provided at the portion of its length adjacent a straight course of the run of the saw with separated laterally extended brackets 48 and 49, one thereof, 48, being permanently affixed, while the other 49, is longitudinally adjustable along the swing beam.

These brackets carry pairs of companion axially vertical rollers 50, 50, between which a straight course of the band saw runs, and which rollers have flanges at upper portions thereof for engagements against the upper edge of the band saw for insuring the imparting of forcible pressure in a downward direction against the saw at the place of its working action in relation to the work holding vise.

One of the paired, roller carrying brackets, here represented as the one 49, is adjustable along the swing beam 25 toward and away from the other roller carrying bracket 48.

The bracket 49 is shown as having portions 52 to bear against the under edges of the beam side members and also having an upwardly extended portion 53 to slidably fit between such members and to extend partially through the space therebetween.

Associated with such portions 52 and 53 of the bracket 49 is a clamping block 54, entering and fitting within the space between the side members of the swing beam and having flanges 55, 55, to bear on the upper edges of such side members.

A screw shaft 56 passed loosely through the clamping block 54 and with a screw thread engagement in the portion 53, is effective for binding the bracket in any given set position along the length of the beam.

The hand wheel 57 is represented as providing a means for the rotation of the screw shaft 56 for its clamping or releasing action.

The sleeve 22 at or near the junction therewith of the stud 24, and the lower end portion of the journal stud 36 for the second saw band guiding wheel 31, support spiders or skeleton frames 60, 60, for supporting partially circular upwardly open troughs 62, 62, which underlie the wheels 32 and 31 and the portions of the band saw carried thereby.

These troughs serve to catch oil which is copiously supplied on the working running course of the saw adjacent the piece being cut by the saw, and have in conjunction therewith means whereby the oil caught thereby is eventually returned to the reservoir 64 containing the supply.

The reservoir is contained within the portion of the machine under the work confining support 43 and is conducted therefrom by a pump 65 connected by pipe 66 with the reservoir and which forces the oil by the pipe 67 to its place of delivery on the running saw, or on the piece being cut in proximity to the saw.

The pump, which is of the rotary type, is represented as driven by belt 68 running from the shaft 16 around the driving pulley 69 of the pump. The oil caught by the troughs is conveyed back into the reservoir 64 through an upwardly opening chute 70 which opens into the side of the reservoir above the oil level therein and is carried thereto from the end portion of the trough 62 which terminates just in front of the saw guiding wheel 35, as shown in Fig. 1.

The troughs 62 under the wheels 31 and 35, have tangentially extended longitudinal portions 62$^a$ and 62$^b$, under and in line with the rear course of the band saw 14, these being separately formed and have overlapping and slidable relations one with the other, so that when the wheel 35 is bodily adjusted along the swing beam, the trough sections may be moved in a telescopic manner, at all times maintaining their original relations to the saw driving and guiding wheels.

The troughs 62, 62 not only serve to economize oil, but are also valuable as safety guards for the running saw, protecting the attendant's hands from the toothed edge of the saw everywhere except immediately at the place of contact with the work, and protecting the angle or nip between the running saw and the peripheries of both the drive and guide wheels from the careless insertion of a hand or a finger.

The swing beam 25 having its primary support or fulcrum from the shaft 16, and having considerable extension longitudinally of the machine beyond its center of motion, has applied to its end portion which comparatively slightly overhangs the fulcrum, a counter-balancing device which is here represented as consisting of a spiral spring 72, one end of which is connected by a length of chain to the beam, while the other end thereof is connected by a length of chain to a bracket 73 secured to the bed or frame.

In the operation of the machine the piece to be transversely sawed is placed on the table-like support 43 of the vise to project suitably rearwardly therebeyond under the forward straight course of the saw and confined.

The swing beam is then permitted to present the running course of the band saw for its working action on the piece,—the weight or gravitative action of the swing beam effecting the down feed as the progressive cutting ensues.

The adjustment of the wheel 35 longitudinally of the swing beam is effective for take up of slack in the saw, and for properly tensioning the same both in the initial placing of the saw around the wheels, and also after use when the saw may have become stretched.

The band saw being driven or hauled around by the drive wheel 31, and lubricated as hereinbefore described, has the surplus of oil wiped therefrom by the opposed pair of brushes 73, 73, carried by the bracket 48 on which the pair of rollers 50, 50, are supported.

The greater portion of the oil carried along by the saw will fall into the pan 74, the open end portion 75 of which is positioned for emptying into the upwardly open chute 70.

The table-like top of the work holding device has a comparatively long slot 76 therein in which the tongue of the movable member 45 of the vise engages, but by which movable member the slot 76 is, as to a large portion of the length thereof, uncovered.

The oil delivered from the pipe and not carried along by the band saw will for the most part flow through the slot 76 into the reservoir 64.

In Figs. 1, 2, 3, 4 and 7, the journal studs for the band saw driving and guiding wheels are extended with an upward and rearward slant, and both coincident with parallel planes which are transverse of the length of the machine.

This provides that the rear course of the saw will be carried along a line higher than the front course of the saw so that a piece to be confined on the support 43 may project rearwardly in any indefinite extent without interfering with the run of the saw; and, inasmuch as the courses of the saw, conformable to the positions of the driving and guiding wheels are in oblique planes, the rollers 50, 50, the peripheries of which are vertical, deflect the working portion of the front course of the saw to a vertical plane as is necessary or most desirable for the proper performance of the work.

In Figs. 8 and 9, a metal sawing machine having generally the characteristics of the one described in the preceding figures, is represented, but this machine is made in respect to its capability for a duplex sawing action, that is the front course running, for instance, from right to left may make a cut on a piece of work supported thereunder, while the rear course running from left to right will make a cut on the same, or another piece supported thereunder.

In the machine of this design, two oppositely located work holding devices or vises, including the table-like supports 43, the fixed abutments 44 and screw actuated confining members 45 are provided.

In the machine of the above mentioned design, the stud 24 upwardly extended from the sleeve 22, forming the support for the swing beam 25 and the journal for the saw driving wheel 31, is truly vertical as is also the stud 36 for the saw guiding wheel 35, so that the beam and said wheels are maintained in horizontal planes, and the saw, as to its width, runs vertically,—and not obliquely.

Here it is possible to make use of the machine for a great capacity of work where short sections, blocks or plinths are to be produced from bar stock which may be supported and confined in the opposite vises with their ends approached, but, nevertheless, in considerable separation as permitted by the distance between the front and the rear courses of the band saw.

The machine is provided with means for holding the swinging beam 25 in its elevated or waiting and idle position, and for automatically locking the swinging beam from further motion, which might break the saw, after a cut is finshed. Referring to Figs. 7 and 7ª, preferred means for this purpose comprise a latch adapted to hold the swinging beam elevated, which, having been manually released, is then adapted to latch the beam against further motion than a predetermined motion toward the work-support and to a place where the saw shall have finished its cut. As shown the sleeve 22 is provided with lugs bored for a pivot 84 on which the latch 82 swings, one face of latch 82 being provided with notches 83 to take over a detent such as a web of the part 17 of the frame at the respective elevated and predetermined low positions of the beam 25 represented by the respective angular positions of the sleeve 22 at which the notches 83 can engage the frame. The latch 82 can be operated by a push-rod 85 free to swing with the latch and extending to a point convenient for the operator.

When the beam 25 is up, the operator at starting releases the latch 82 which then engages the frame by its upper notch, and then brings the running saw against the work by manually controlling the beam. The operator may then leave the machine to complete the cut, the lower notch 83 being engaged when the beam falls below the position reached when the work has been cut through by the saw.

I claim :—

1. A metal sawing machine of the type comprising a work support, an endless saw, means for supporting and for driving the saw in a constant direction, and a beam carrying the saw and its supporting means mounted for motion toward and away from the work, having in combination with these elements means tending to cause motion of the beam toward the work with a regulated force, means for releasably holding the beam in initial position, and means to suspend this motion automatically at a predetermined point in relation to the work support.

2. A metal sawing machine adapted for an endless band saw having therein a rigid base and a work-support in fixed relation thereto, and means for supporting, driving and laterally moving a run of the saw in relation to the work comprising a sleeve in wide bearings on the base, a beam rigidly mounted on the sleeve, a driving wheel and a guide wheel for the saw on bearings movable with the beam, the driving wheel being journaled to rotate on an axis at an angle to the axis of motion of the sleeve and the beam, in combination with a drive shaft and a drive pinion thereon concentric with the sleeve, said drive pinion and drive wheel having a coacting driving connection outside of the bearings for said sleeve.

3. A metal sawing machine of the type comprising a work support, an endless saw, means for supporting and for driving the saw in a constant direction, and a beam carrying the saw and its supporting means mounted for motion toward and away from the work, having in combination therewith means movable on the beam for regulating the tension of the saw, and a guard trough surrounding the saw having a section movable with said movable regulating means.

4. A metal sawing machine adapted for a band saw having therein a swinging beam to carry the saw comprising spaced members, and guide devices for the saw having supporting brackets held between said members for longitudinal adjustment thereon, in combination with means for clamping together the members of the beam and said brackets.

5. In a metal sawing machine, in combination, a supporting bed or frame, a shaft transversely mounted on the frame, a sleeve mounted for a partially revolving movement on the shaft and having an upwardly extended stud, a combined saw driving wheel and bevel gear wheel journaled for rotation on said stud, a bevel gear wheel on the shaft in mesh with the first named bevel gear wheel, and means for driving the shaft, a beam rigidly secured on and adapted to swing with said stud, a block slidably adjustably mounted on the beam at its end portion opposite from said stud and provided with a depending journal member, a saw guiding wheel mounted for rotation on said journal member, a screw shaft rotative in, but endwise non-movable relatively to, the beam, and having a screw engagement with said block, and means for rotating said screw shaft, and an endless band-saw in running engagement around the saw driving and saw guiding wheels.

6. In a metal sawing machine, in combination, a supporting bed or frame, a shaft transversely mounted on the frame, a sleeve mounted for a partially revolving movement on the shaft and having a stud extended radially upwardly therefrom, a combined saw driving wheel and bevel gear wheel journaled for rotation on said stud, a bevel gear wheel on the shaft in mesh with the first named bevel gear wheel, and means for driving the shaft, a beam rigidly secured on and adapted to swing with said stud, a block slidably adjustably mounted on the beam at its end portion opposite from said stud and provided with a depending journal member, a saw guiding wheel mounted for rotation on a said journal member, a screw shaft rotative in, but endwise non-movable relatively to, the beam, and having a screw engagement with said block, and means for rotating said screw shaft, an endless band-saw in running engagement around the saw driving and saw guiding wheels, and brackets laterally extended from the beam, one thereof being adjustable along the beam relatively to the other, and having coacting pairs of axially vertical rollers between which a straight course of the band saw runs, and said rollers having flanges for engagements against the upper edge of the band saw.

7. In a metal sawing machine, in combination, a supporting bed or frame, a shaft transversely mounted on the frame, a sleeve mounted for a partially revolving movement on the shaft and having an upwardly extended member, a combined saw driving wheel and bevel gear wheel journaled for rotation on said member, a bevel gear wheel on the shaft in mesh with the first named bevel gear wheel, and means for driving the shaft, a beam rigidly secured on and adapted to swing with said member, a saw guiding wheel mounted on an end portion of the beam opposite from said member and adjustable longitudinally on the beam, an endless bandsaw in running engagement around the saw driving wheel and the saw guiding wheel, a pair of brackets extended transversely from the beam, having pairs of rolls between which a straight course of the band saw runs, and one of the brackets carrying opposed brushes bearing on opposite sides of the saw.

8. In a metal sawing machine, in combination, a supporting bed or frame, a shaft transversely mounted on the frame, a sleeve mounted for a partially revolving movement on the shaft and having an upwardly extended stud, a combined saw driving wheel and bevel gear wheel journaled for rotation on said stud, a bevel gear wheel on the shaft in mesh with the first named bevel gear wheel, and means for driving the shaft, a beam, secured on said stud and adapted to swing in a plane transversely of the shaft, said beam comprising opposite side members and open therebetween, a saw guiding wheel mounted on an end portion of the beam opposite from said combined driving wheel and gear, an endless band-saw in running engagement around the saw driving wheel and the saw guiding wheel, a pair of brackets having saw engaging rollers carried by and laterally extended from the beam, one thereof having portions to bear against the edges of the beam side members and also having a block to slidably fit between such members, and a flanged block, opposite the first named block, slidably engaged with the beam, a screw shaft rotatively but endwise non-movable relatively to one of the blocks, and screw engaging into the other thereof, and a work confining device on the frame under the running course of the saw between said wheels.

9. In a metal sawing machine, in combination, a supporting bed or frame, a shaft transversely mounted on the frame, a sleeve mounted for a partially revolving movement on the shaft and having an upwardly extended stud, a combined saw driving wheel and bevel gear wheel journaled for rotation on said stud, a bevel gear wheel on the shaft in mesh with the first named bevel gear wheel, and means for driving the shaft, a beam rigidly secured on and adapted to swing with said stud, a member at the end of the beam opposite the stud having a depending journal, a saw guiding wheel revoluble on said journal, an endless band saw running around the driving and guiding wheels therefor, partially circular upwardly open oil receiving troughs under the portions of the saw which are rounding the wheels, supports therefor, one thereof being carried by the sleeve and the other by the lower portion of said depending journal, and means for feeding oil onto a running course of the saw.

10. In a metal sawing machine, in combination, a supporting bed or frame, a shaft transversely mounted on the frame, a sleeve mounted for a partially revolving movement on the shaft and having an upwardly extended stud, a combined saw driving wheel and bevel gear wheel journaled for rotation on said stud, a bevel gear wheel on the shaft in mesh with the first named bevel gear wheel, and means for driving the shaft, a beam rigidly secured on and adapted to swing with said stud, a member at the end of the beam opposite the stud having a depending journal, a saw guiding wheel revoluble on said journal, an endless band saw running around the driving and guiding wheels therefor, partially circular upwardly open oil receiving troughs under the portions of the saw which are rounding the wheels, supports therefor, one thereof being carried by the sleeve and the other by the lower portion of said depending journal, an oil reservoir, an oil pump pipe-connected with the reservoir and having a discharge pipe for delivering oil onto a running course of the saw, and means for conducting the oil from the trough back to the reservoir.

11. In a metal sawing machine, a swing beam, a saw driving and a saw guiding wheel at opposite end portions of the beam, one thereof being longitudinally adjustable on the beam, means for rotating the saw driving wheel, and a band saw in running engagement around said wheels, troughs comprising partially circular portions and longitudinally extended portions supported under the portions of the saw which are around the wheels and movable in unison with such wheels as they swing with the beam, a longitudinally extended portion of one trough being continued to have an overlapping and slidable relation to the end portion of the other trough, and means for feeding oil for delivery at the place of the working action of the saw.

12. In a metal sawing machine, a swing beam, a saw driving and a saw guiding wheel at opposite end portions of the beam, one thereof being longitudinally adjustable on the beam, means for rotating the saw driving wheel, and a band saw in running engagement around said wheels, troughs comprising partially circular portions and longitudinally extended portions supported under the portions of the saw which are around the wheels and movable in unison with such wheels as they swing with the beam, a longitudinally extended portion of one trough being continued to have an overlapping and slidable relation to the end portion of the other trough, a reservoir comprised in the bed of the machine having an upwardly opening chute leading thereinto, and a pump for pumping oil from the reservoir for delivery at the place of working action of the saw,—an end of one of the troughs terminating in oil delivering relation to said chute.

13. In a metal sawing machine, a bed or frame including a work supporting and confining vise, the horizontal table-like portion of which forms the top of an oil reservoir which is comprised and located in the bed thereunder, and said table-like portion having an elongated opening therethrough communicating with the reservoir, a swing beam, having saw driving, and guiding wheels combined therewith, a band saw around the wheels and having a running course over and across the work support, and means for rotatively driving one of the wheels, and a pump pipe-connected with the reservoir and having a pipe for oil delivery onto the portion of the saw traversing the work support.

14. In a metal sawing machine, in combination, a supporting bed or frame, a shaft transversely mounted on the frame, a sleeve mounted for a partially revolving movement on the shaft and having an upwardly extended stud, a combined saw driving wheel and bevel gear wheel journaled for rotation on said stud, a bevel gear wheel on the shaft in mesh with the first named bevel gear wheel, and means for driving the shaft, a beam near one end thereof rigidly secured on and adapted to swing with said stud, a saw guiding wheel mounted on an end portion of the beam opposite from said stud, an endless band-saw in running engagement around the saw driving and saw guiding wheels, and a counterbalancing spring connected to the end of the beam near said stud and to a part of the frame.

15. In a metal sawing machine, in combination, a bed or frame, a beam supported at one end portion thereof to swing vertically relatively to the bed, a saw driving wheel below the beam near its supporting portion, and a saw guiding wheel supported by and below the beam at its free end portion, a band saw in running engagement around said wheels, and oppositely located work supporting and confining devices arranged under and in proximity to the reversely running straight courses of the band saw between said wheels.

16. A metal sawing machine of the type comprising a rigid base, a work-support, an endless saw, means for supporting and for driving the saw, and a beam for carrying the saw and its supporting means, having therein means permitting motion of the beam in a vertical arc about an axis to one side of the work-support comprising a sleeve having spaced bearings in the rigid base, and means for rigidly attaching the beam to the sleeve between said bearings.

17. A metal sawing machine adapted for a band-saw having therein a work-support and a swinging mounting for the saw, and means for supplying oil to the saw and the metal being cut, comprising a reservoir beneath the work, a guard trough surrounding the rim of the saw having delivery openings above gravity inclines leading to the reservoir, and adapted to deliver oil collecting in the trough to the reservoir by gravity when the swinging frame is in its working positions.

Signed by me at Springfield, Mass., in presence of a subscribing witness.

CHARLES NAPIER.

Witness:
G. R. DRISCOLL.